United States Patent [19]

Zeibig et al.

[11] Patent Number: 4,929,668
[45] Date of Patent: May 29, 1990

[54] AQUEOUS SYNTHETIC DISPERSIONS

[75] Inventors: Winfried Zeibig, Moers; Heinrich Hüskes, Krefeld, both of Fed. Rep. of Germany

[73] Assignee: Deutsche Texaco Aktiengesellschaft, Hamburg, Fed. Rep. of Germany

[21] Appl. No.: 222,582

[22] Filed: Jul. 21, 1988

[30] Foreign Application Priority Data

Jul. 28, 1987 [DE] Fed. Rep. of Germany ....... 3724858

[51] Int. Cl.$^5$ .............................................. C08J 5/01
[52] U.S. Cl. .................................. 524/745; 524/812; 524/746; 524/747; 524/748; 524/769; 524/832; 524/829; 524/831
[58] Field of Search ............... 524/812, 460, 555, 562, 524/745, 832

[56] References Cited

U.S. PATENT DOCUMENTS 4,358,403 11/1982 Distler et al. .................... 524/812

*Primary Examiner*—Joseph L. Schofer
*Assistant Examiner*—Mark D. Sweet
*Attorney, Agent, or Firm*—Thomas H. Whaley

[57] ABSTRACT

Aqueous synthetic dispersions based on copolymers of acryl polymers and/or vinyl polymers containing both hydroxylalkyl(meth)acrylate monomers and etherified N-alkylol(meth)acrylamide monomers. These dispersions are suitable as bonding agents for the production of glossy and solvent-resistant, thermosetting coating materials with good adhesion.

9 Claims, No Drawings

AQUEOUS SYNTHETIC DISPERSIONS

BACKGROUND OF THE INVENTION

This invention relates to an aqueous synthetic dispersion based on a copolymer of acrylic monomers and/or vinyl monomers where the copolymer contains at least two different monomers that are crosslinkable with each other, as well as emulsifiers.

Aqueous copolymer dispersions are of particular interest for the production of thermosetting coatings because they do not burn and as they are physiologically less precarious than solvent containing coatings. Moreover, recovery of expensive solvent can be dispensed with. Besides the properties demanded of all synthetic dispersions such as good flow, good processability, absence of coagulate, storage stability and temperature resistance, it is also particularly important for dispersions which shall be used as binders for the production of thermosetting coatings that glossy coating materials with good leveling characteristics and good adhesion are obtained which, after thermal treatment, are largely resistant to solvents, particularly to ketones, alcohol and hydrocarbon mixtures. After thermal treatment, those coating materials shall be hard, scratch resistant and, under the influence of heat, blocking resistant. To this end the copolymers forming the basis of the dispersions contain at least two chemically different groups which are introduced into the molecule by polymerization and which, after the film has dried up, lead to crosslinking of the previously thermoplastic copolymer during heating.

It is generally known, as shown in DE-OS 31 47 007, to produce thermosetting coating materials, containing as binders, aqueous dispersions based on acrylic monomers by copolymerization of N-methylolacrylamide and hydroxyalkyl(meth)acrylates. However, during curing those dispersions give off larger amounts of formaldehyde which have to be intercepted with urea so that the water resistance of the corresponding products is reduced.

It is also known to produce solvent containing acrylic resins containing hydroxyl groups and alkoxymethyl(meth)acrylamide groups for crosslinking. However, those systems contain solvents and, because of the low molecular weight of the polymer resin, they will not reach sufficiently high molecular weight, even not with crosslinking, such that the gloss is retained under the influence of solvent or weathering.

Thus, it is an object of the present invention to produce an aqueous dispersion of a copolymer which is selfcrosslinking when heated and results in glossy, solventresistant coatings with good adhesion to metallic and plastic substrates.

DISCLOSURE STATEMENT

DE-OS 33 28 456 discloses the use of cyclic urea compounds for interception released formaldehyde which likewise reduces the water resistance of such dispersions.

DE-OS 23 74 364 discloses the production of binders which contain chlorovinylacetate in copolymerized form and, thus, are crosslinkable by alkali. Those dispersions have the disadvantage of alkalichloride formation likewise resulting in reduced water resistance of the coatings prepared therefrom.

Publications DE-AS 12 48 194, DE-PS 24 31 577 and DE-OS 31 28 143 disclose two-component crosslinking binders which consist of aqueous dispersions of copolymers containing hydroxyl groups or carboxyl groups to which low-molecular amino resins, phenolic resins or melamine resins are added for crosslinking. Even after curing, those coating materials still contain some low-molecular resin which, under the influence of water or solvent, results in gloss reduction of the preparations made therefrom.

SUMMARY OF THE INVENTION

The present invention provides an aqueous synthetic dispersion which contains a solid polymer substance based on a copolymer of acryl monomers and/or vinyl monomers where the copolymer contains at least two different monomers that are crosslinkable with each other and emulsifiers. The dispersion comprises, as the solid polymer substance, monomers selected from the group consisting of:

(a) 20 to 60 wt. % of a vinyl benzene which may be substituted with $C_1$–$C_4$ alkyl groups in the core or in the vinyl group and/or of tertbutylacrylate or of a methacrylate with a $C_1$–$C_5$ monoalcohol component and/or of a vinyl ester with a $C_1$–$C_{11}$ monocarboxylic acid component or of a mixture of such monomers each of the individual monomers with a homopolymer glass temperature higher than 35° C.;

(b) 25 to 55 wt. % of an acylate with a $C_1$–$C_8$ monoalcohol component and/or of a methacrylate with a $C_5$–$C_{10}$ monoalcohol component and/or of a vinyl ester with a $C_1$–$C_{11}$ monocarboxylic acid component or of a mixture of such monomers, each of the individual monomers with a homopolymer glass temperature of less than 35° C.;

(c) 8 to 15 wt. % of a (meth)acrylate monomer with a $C_2$–$C_8$ alkane polyol component;

(d) 8 to 15 wt. % of an etherified N-alkylol-(meth)acrylamide of the general formula $$CH_2=C(R_1)-C(O)-NH-(A)-O-R_2,$$

wherein $R_1$ represents hydrogen or methyl, A represents $C_1$–$C_4$ n- or iso-alkylene and $R_2$ represents $C_1$–$C_4$-alkyl;

(e) 0.5 to 5 wt. % of an alpha, beta-unsaturated monocarboxylic acid with 3 to 5 carbon atoms and/or of an alpha, beta-unsaturated dicarboxylic acid with 3 to 5 carbon atoms; and (f) 0 to 4 wt. % of an amide of an alpha, beta-unsaturated monocarboxylic acid with 3 to 5 carbon atoms and/or of an alpha, beta-unsaturated dicarboxylic acid with 4 to 5 carbon atoms.

DETAILED DESCRIPTION OF THE INVENTION

According to the present invention, it was found that by thermal crosslinking those copolymer dispersions containing solely hydroxyalkyl(meth)acrylate or etherified N-alkylol (meth)acrylamide yield coatings with insufficient solvent resistance and adhesion to metals even if low-molecular hexamethoxymethylmelamine resins are added. Solely, the simultaneous copolymerization according to the invention of hydroxyalkyl(meth)acrylates and etherified N-alkylol(meth)acrylamides to form acrylic copolymer dispersions results in glossy, solvent-resistant coatings with good adhesion to metallic substrates, also to non-degreased aluminum sheet or hot-galvanized iron sheet, even if no low-molecular urea resins or melamine resins are added.

Hence, the object of the present invention for producing a glossy coating is an aqueous synthetic dispersion on the basis of a copolymer of acrylic monomers and/or vinyl monomers containing both hydroxyalkyl(meth)acrylate monomers and etherified N-alkylol(meth)acrylamide monomers in copolymerized form. The aqueous synthetic dispersion, according to the present invention, has a particle size in the range of 30 nm to 400 nm.

The synthetic dispersion, according to the present invention, has the following preferred composition, referring to the polymer substance and component monomers thereof:
30–50 wt. % of component (a)
33–50 wt. % of component (b)
9–11 wt. % of component (c)
9–11 wt. % of component (d)
1–3 wt. % of component (e)
0.5–1.5 wt. % of component (f)

Furthermore, the invention relates to the production of the aqueous synthetic dispersion by radical emulsion copolymerization of the monomers mixture in the presence of a radical-forming catalyst and of one or more emulsifiers.

The emulsion polymerization is preferably carried out in the presence of 0.3–1.5 wt. % catalyst and 0.1–5 wt. % emulsifier(s).

The present process is particularly characterized by carrying out the emulsion polymerization in the presence of ammonium salts, sodium salts or potassium salts of the peroxodisulfuric acid or of the peroxodiphosphoric acid or mixtures thereof as catalyst and in the presence of sodium salts, potassium salts, or ammonium salts of sulfosuccinic acid esters and sulfosuccinic acid semi-esters, alkanol sulfates and oxethylated alkyl phenol sulfates as anionic emulsifiers and/or oxethylated fatty alcohol or fatty alcohol ethanolamide with 3–20 moles of ethylene oxide as nonionic emulsifier or mixtures thereof.

The emulsion polymerization is carried out in aqueous solution in apparatuses known as such by preferably placing part of the water, of the monomers, of the emulsifiers and of the initiator into the reactor, heating the contents and, after start of the polymerization, slowly feeding at polymerization temperature, a preemulsion consisting of the remaining components.

Finally, the invention relates to the use the dispersions thus produced as binders for the production of thermosetting coating materials.

To obtain the desired properties without use of larger quantities of film-forming agent, the glass transition temperature (TG) of the dispersion prepared from the monomers combination (a) to (f) must be less than 60° C. so that the minimum film-forming temperature is in the range of 0° C. to 50° C.

To attain sufficient reactivity during selfcrosslinking producible by heat, the copolymer contains 16–30, preferably 18–22 wt. % monomers (c) and (d), referring to the sum of the monomers (a) to (f) totaling 100.

Incorporation of unsaturated carboxylic acids (e) in the copolymer increases the stability of the dispersion during production, storage and use. Particularly in the production of high-gloss lacquers very high shearing stress occurs during pigmentation what may result in coagulation with customary dispersions. For this reason the copolymer contains 0.5–5 preferably 1–3 wt. %, referring to the sum (a) to (f) totaling 100, of an alpha, beta-unsaturated monocarboxylic acid with preferably 4 or 5 carbon atoms and/or of an unsaturated dicarboxylic acid with preferably 4 or 5 carbon atoms, or of a mixture of such monomers. Suitable acids are acrylic acid, methacrylic acid, crotonic acid, maleic acid, fumaric acid and itaconic acid. Acrylic acid and/or methacrylic acid are preferred.

In addition, the copolymer contains 0–4 wt. % of an alpha, beta-unsaturated monocarboxylic acid amide and/or of an unsaturated dicarboxylic acid amide or of a mixture of such monomers, referring to the sum (a) to (f) totaling 100. These monomers shall contribute to stabilization during production and processing. Moreover, they serve for adjusting the desired particle size. Preferred are 0.5–1.5 wt. % referring to the sum (a) to (f) totaling 100.

The type and quantity of the monomers have to be chosen in dependence on the requirements made on the self-crosslinking stoving coating with respect to hardness as well as resistance to water, weathering, solvents and chemicals.

The copolymer dispersion, according to the present invention, has a solids content of 30–60 wt. %, preferably 40–50 wt. %. Besides the copolymer it contains one or more anionic emulsifiers and/or one or more non-anionic emulsifiers.

Examples of usable anionic emulsifiers are alkali salts of sulfuric or phosphoric acid partial esters of alcohols, oxyethylated alkyl phenols or alcohols as well as alkyl or aryl sulfonates. Moreover, salts of sulfosuccinic acid esters and semi-esters as well as N-substituted sulfosuccinic acid amides are suitable. Preferably, sulfosuccinic acid semi-esters, alkanol sulfates and oxyethylated alkyl phenol sulfates re used in a quantity of 0.1–5 wt. %, referring to monomers (a) to (f) totaling 100.

To increase the stability of the dispersions according to the present invention, one or more non-anionic emulsifiers of the type of an oxethylated alkyl phenol or fatty alcohol, e.g., nonyl phenol with 4–50 moles and particularly 3–20 moles of ethylene oxide, are additionally used in a quantity of 0.1–5 , preferably 0.5–2 wt. %, referring to monomers (a) to (f) totaling 100.

As catalysts or initiators, the customary ammonium salts, sodium salts and potassium salts of the peroxodisulfuric acid and of the peroxodiphosphoric acid are suitable. Also, organic peroxides, e.g., dibenzene peroxide or tertbutylhydroperoxide can be used. Reducing agents, particularly sodium disulfite, hydrazine, hydroxylamine can be used as activators. Furthermore, salts of transition metals such as of cobalt, iron or vanadium can be used as accelerators for the polymerization reaction.

The polymerization process according to the present invention is carried out as an emulsion polymerization in an aqueous medium in known apparatuses such as a agitated kettle with a heating and cooling device. The monomers are emulsified in an aqueous medium. The monomers can be added in a way that a solution of the total amount of water and emulsifier and of part of the initiator is placed into the kettle and that the monomers mixture and the remainder of the initiator are slowly added at polymerization temperature. Moreover, it is possible to place part of the water, of the emulsifiers and of the initiator into the kettle, to prepare a preemulsion from the monomers, the remaining water, the remaining emulsifiers and the remaining initiator and to slowly add it at polymerization temperature. Furthermore, it is possible to place a part of the water, of the monomers, of the emulsifiers and of the initiator into the reactor and to prepare a preemulsion from the remaining components. In this preferred process the contents of the reactor is heated and, after start of the polymerization, the preemulsion is slowly added during 1-4 hours at polymerization temperature. In this preferred process, 15-50 wt. % of the total amount of water, referring to the batch size, 10-70 wt. % of the total amount of catalyst and 3-20 wt. % of the monomers as well as 10-60 wt. % of the emulsifiers feed are present in the reactor at the beginning.

The polymerization temperature ranges between 50° C. and 100° C., preferably 80-95° C. When addition of the monomers mixture or of the preemulsion is terminated, the batch is further agitated for 0.5-3 hours at 50-100° C., preferably 80-95° C., in order to reduce the residual monomers.

The copolymers obtained by the process according to the present invention have glass transition temperatures in the range of 0 to <60° C., preferably of +10 to +40° C. The process, according to the present invention, results in copolymers with an average particle size of between 30-400 nm, preferably between 90-180 nm.

The copolymer dispersion, according to the present invention, can be used for formulating clear or pigmented lacquers. For pigmented systems, the procedure is such that part of, or the total amount of, the dispersion required is homogenized with pigments and/or fillers as well as with the usual lacquer auxiliaries and, optionally, with neutralizers to form a pigment paste. In the preferred case, only part of the dispersion is placed first into the reactor and the remaining quantity of dispersion is added after homogeniztion of the pigment paste.

The coating materials based on the copolymer dispersion, according to the present invention, can be applied to a multitude of substrates w , however, must withstand the stoving temperature without deterioration. Suitable substrates are metals such as iron, steel, zinc, aluminum, copper, bronze or brass. Other suitable substrates are different plastic materials such as polyvinylchloride, polymethylmethacrylate, polyurethanes, polycarbonates, polyolefins, polystryene and other mixed polymerizates. Furthermore, wood is also suitable as a substrate. The pigmented or unpigmented dispersion lacquers can be applied to the substrates by spray guns, doctor knives, rollers as well as by painting or dipping. Then the coated object is ventilated at room temperature or slightly above room temperature and is partly or completely dried. Then the lacquer film is cured by 'stoving' at a temperature of 60-200° C. The coatings, according to the present invention, are stoved during a period of 5-45 minutes. The thickness of the dry film ranges between 20 and 300 microns, preferably between 30 and 100 microns.

The stoved pigmented or unpigmented lacquer films of the coating materials based on the copolymer dispersion, according to the present invention, have an excellent flow. Surface defects such as cratering, orange peel effect, cracks caused by shrinkage or stress as well as formation of specks and pores, which are often observed, do not occur. Moreover, those lacquer films have good hiding power, smoothness (slip effect), elasticity, gloss, adhesion, weather and yellowing resistance.

The following examples shall illustrate the invention in detail. Statements of percentage and ratios refer to the weight. The polymerization examples were carried out in a customary glass-made polymerization unit with reactors, stirrers, lines and storage containers.

EXAMPLE 1

Referred to is a process with two preemulsions: a starting solution, that one in the reaction vessel and a preemulsion prepared in a storage vessel.

Composition

Starting solution (in the reactor):
231.0 g of demineralized water
40.5 g of disodium-laurylether-sulfosuccinate
32.6 g of nonyl phenol with 10 ethylene oxide
23.1 g of acrylamide (30% in water)
9.8 g of methacrylic acid
47.4 g of ammonium peroxodisulfate (5% in water)
86.7 g of methylmethacrylate
67.4 g of n-butylacrylate
19.3 g of 2-hydroxyethylmethacrylate
19.3 g of N-isobutoxymethylacrylamide Pre-emulsion (in the storage vessel):
481.3 g of demineralized water
57.8 g of disodium-laurylether-sulfosuccinate
32.4 g of nonyl phenol with 30 ethylene oxide
6.4 g of acrylamide (30% in water)
10.8 g of methacrylic acid
70.3 g of ammonium peroxodisulfate (5% in water)
342.7 g of methylmethacrylate
267.6 g of n-butylacrylate
77.0 g of 2-hydroxyethylmethacrylate
77.0 g of N-isobutoxymethylacrylamide

Procedure

The starting solution was heated while stirring. When the reactor contents reached 80° C., regular feeding of the preemulsion from the storage vessel was started. This took two hours. After start of the reaction, a temperature of 95° C. was attained very rapidly. After reaching the temperature maximum, the temperature of the contents decreased rapidly. Therefore, the reactor contents was maintained at 85° C. during the reaction by additional heating. After termination of preemulsion feeding from the storage vessel, a secondary reaction was carried out at 85° C. while stirring in order to reduce the residual monomers. Then the polymer dispersion was cooled at room temperature while stirring. After sieving through a 63-micron sieve a 50 percent solids containing dispersion with a pH-value of 4.1 and a viscosity of 150 mPas was obtained. The particle size of this dispersion was 125 nm.

EXAMPLE 2

Referred to is a process with two pre-emulsions of which one, the starting solution, was prepared in the reactor and the other was prepared in a storage vessel with a stirrer.

Composition

Starting solution (in the reactor):
200.0 g of demineralized water
10.5 g of sodium lauryl sulfate (30% in water)
12.7 g of nonyl phenol with 10 ethylene oxide (24%)
18.0 g of acrylamide (30% in water)
7.7 g of methacrylic acid
36.9 g of ammonium peroxodisulfate (5% in water)
23.8 g of methylmethacrylate
35.7 g of n-butylacrylate Pre-emulsion (in the storage vessel):
400.0 g of demineralized water
5.0 g of sodium lauryl sulfate (30% in water)

12.6 g of nonyl phenol with 30 ethylene oxide (25%)
5.0 g of acrylamide (30% in water)
8.4 g of methacrylic acid
54.8 g of ammonium peroxodisulfate (5% in water)
214.3 g of methylmethacrylate
321.6 g of n-butylacrylate
75.0 g of 2-hydroxyethylmethacrylate
75.0 g of N-isobutoxymethylacrylamide Procedure The reactor contents was heated while stirring. The reaction started at about 78° C. Then regular feeding of the pre-emulsion from the storage vessel was begun and continued for 90 minutes. The reaction temperature increased at 82° C. and was maintained during feeding. After termination of pre-emulsion feeding, a secondary reaction was carried out for 90 minutes at 82° C. in order to reduce the residual monomers. Then the dispersion was cooled at 35° C. and filtered through a 63-micron sieve. The dispersion contained 48 percent solids, had a pH-value of 2.3 and a particle size of 140 nm. The viscosity was 170 mPas.

EXAMPLE 3

Referred to is a process with two pre-emulsions of which one, the starting solution, is prepared in the reactor and the other is prepared in a storage vessel with stirrer.

Composition

Starting solution (in the reactor):
280.0 g of demineralized water
11.1 g of sodium lauryl sulfate (30% in water)
13.4 g of nonyl phenol with 10 ethylene oxide (24%)
18.9 g of acrylamide (30% in water)
8.1 g of methacrylic acid
38.8 g of ammonium peroxodisulfate (5% in water)
25.1 g of styrene
37.6 g of n-butylacrylate
Pre-emulsion (in the storage vessel):
575.0 g of demineralized water
15.8 g of sodium lauryl sulfate (30% in water)
13.3 g of nonyl phenol with 30 ethylene oxide (25%)
5.3 g of acrylamide (30% in water)
8.9 g of methacrylic acid
57.6 g of ammonium peroxodisulfate (5% in water)
225.8 g of styrene
329.3 g of n-butylacrylate
79.1 g of 2-hydroxyethylmethacrylate
79.1 g of N-isobutoxymethacrylamide Procedure The reactor contents was heated while stirring. The reaction started at about 75° C. Then regular feeding of the pre-emulsion from the storage vessel was begun and continued for 90 minutes. The reaction temperature increased at 85° C. and was maintained during feeding. After termination of pre-emulsion feeding, a secondary reaction was carried out for 45 minutes at 85° C. in order to reduce the residual monomers. Then the dispersion was cooled at 35° C. and filtered through a 63-micron sieve. The dispersion contained 43.5 percent solids, had a pH-value of 2.7 and a particle size of 119 nm. The viscosity was 600 mPas.

EXAMPLE 4

Referred to is a process with two pre-emulsions of which one, the starting solution, is prepared in the reactor and the other is prepared in a storage vessel with stirrer.

Composition

Starting solution (in the reactor):
329.0 g of demineralized water
11.1 g of sodium lauryl sulfate (30% in water)
13.4 g of nonyl phenol with 10 ethylene oxide (24%)
19.0 g of acrylamide (30% in water)
4.1 g of methacrylic acid
38.8 g of sodium peroxodisulfate (5% in water)
33.4 g of vinylacetate
16.7 g of VeoVa 10 TM
16.7 g of n-butylacrylate
* VeoVa=versatic acid vinyl ester with about 10 carbon atoms
Pre-emulsion (in the storage vessel):
658.0 g of demineralized water
15.8 g of sodium lauryl sulfate (30% in water)
13.3 g of nonyl phenol with 30 ethylene oxide (25%)
5.3 g of acrylamide (30% in water)
4.1 g of methacrylic acid
57.6 g of sodium peroxodisulfate (5% in wter)
279.9 g of vinylacetate
140.0 g of VeoVa 10 TM
140.0 g of n-butylacrylate
79.0 g of 2-hydroxyethylmethacrylate
79.0 g of N-isobutoxymethacrylamide Procedure The reactor contents were heated while stirring. The reaction started at about 72° C. When the temperature reached 80° C., regular feeding of the pre-emulsion from the storage vessel was begun and continued for 90 minutes. The reaction temperature increased at 82° C. and was maintained during feeding. After termination of pre-emulsion feeding, a secondary reaction was carried out for 90 minutes at 85° C. in order to reduce the residual monomers. Then the dispersion was cooled at 35° C. and filtered through a 63-micron sieve. The dispersion contained 40.0 percent solids, had a pH-value of 2.6 and a particle size of 320 nm. The viscosity was 31 mPas.

EXAMPLE 5

(comparison)

Referred to is a process with two pre-emulsions of which one, the starting solution, was prepared in the reactor and the other was prepared in a storage vessel with stirrer.

Composition

Starting solution (in the reactor):
236.0 g of demineralized water
12.3 g of sodium lauryl sulfate (30% in water)
14.9 g of nonyl phenol with 10 ethylene oxide (24%)
21.1 g of acrylamide (30% in water)
9.0 g of methacrylic acid
43.4 g of ammonium peroxodisulfate (5% in water)
32.2 g of methylmethacrylate
39.3 g of n-butylacrylate
Pre-emulsion (in the storage vessel):
472.2 g of demineralized water
17.6 g of sodium lauryl sulfate (30% in water)
14.8 g of nonyl phenol with 30 ethylene oxide (25%)
6.0 g of acrylamide (30% in water)

9.0 g of methacrylic acid
64.5 g of ammonium peroxodisulfate (5% in water)
322.0 g of methylmethacrylate
393.5 g of n-butylacrylate
90.4 g of N-isobutoxymethacrylamide Procedure The reaction contents was heated while stirring. The reaction started at about 78° C. Then regular feeding of the pre-emulsion from the storage vessel was started and continued for 90 minutes. The reaction temperature increased at 85° C. and was maintained during feeding. After termination of pre-emulsion feeding, a secondary reaction was carried out for 60 minutes at 85° C. in order to reduce the residual monomers. Then the dispersion was cooled at 35° C. and filtered through a 63-micron sieve. The dispersion contained 50% solids, had a pH value of 2.1 and a particle size of 135 nm. The viscosity was 228 mPas.

EXAMPLE 6

(comparison)

Referred to is a process with two pre-emulsions of which one, the starting solution, was prepared in the reactor and the other was prepared in a storage vessel with stirrer.

Composition

Starting solution (in the reactor):
280.0 g of demineralized water
10.9 g of sodium lauryl sulfate (30% in water)
13.3 g of nonyl phenol with 10 ethylene oxide (24%)
18.7 g of acrylamide (30% in water)
8.0 g of methacrylic acid
38.4 g of ammonium peroxodisulfate (5% in water)
30.2 g of methylmethacrylate
26.6 g of n-butylacrylate Pre-emulsion (in the storage vessel):
569.0 g of demineralized water
15.5 g of sodium lauryl sulfate (30% in water)
13.1 g of nonyl phenol with 30 ethylene oxide (25%)
5.3 g of acrylamide (30% in water)
8.0 g of methacrylic acid
57.6 g of ammonium peroxodisulfate (5% in water)
436.0 g of methylmethacrylate
284.0 g of n-butylacrylate Procedure The reactor contents were heated while stirring. The reaction started at about 78° C. Then regular feeding of the pre-emulsion from the storage vessel was begun and continued for 90 minutes. The reaction temperature increased at 85° C. and was maintained during feeding. After termination of pre-emulsion feeding, a secondary reaction was carried out for 90 minutes at 85° C. in order to reduce the residual monomers. Then the dispersion was cooled at 35° C. and filtered through a 63-micron sieve. The dispersion contained 46 percent solids, had a pH value of 1.8 and a particle size of 140 nm. The viscosity was 60 mPas.

In Examples 1 and 2, unlike Comparison Example 5 containing only N-isobutoxymethylacrylamide, a considerably higher amount of isobutanol is given off as a proof of crosslinking. Comparison Example 6 does not contain a crosslinking agent.

The ability of the dispersions, according to the invention, for thermal crosslinking were examined 1. gravimetrically
2. gaschromatographically
3. and by performance tests measuring the pendulum hardness.

The gravimetric method consists of applying wet dispersion films in a wet film thickness of 300 microns to weighed glass plates and of drying them for 24 hours at 25° C. Then the mass of the dry film is determined by weighing. The dry films are then stoved for about 2 hours at 150° C. until a constant weight is obtained. The mass of the dry films is then determined again by weighing. Further decrease in weight of the films by stoving is attributed to the loss of isobutanol due to crosslinking.

The gaschromatograhic method consists of adding to the dispersion about 1 percent o-xylene by weighing and of injecting after homogenization part of this mixture into the vaporizer of a gaschromatograph. The amount of isobutanol given off is determined by the usual gaschromatographic method. This method is carried out at vaporizer temperatures of 100 and 175° C.

| Dispersion | Isobutyl Alcohol Release (wt. %) | | |
|---|---|---|---|
| | Gravimetric | Gaschromatographic | Theoretical |
| Example 1 | 2.6 | 1.4 | 1.92 |
| Example 2 | 2.8 | 2.5 | 1.92 |
| Example 5 (comparison) | 1.1 | 0.9 | 1.92 |
| Example 6 (comparison) | 0.8 | 0.0 | 0.00 |

The performance test provides a measure for determining the crosslinking by the change in film hardness as a function of the stoving temperature. The hardness is determined with a pendulum hardness measuring device in accordance with Koenig. The measurement is based on the principle of vibration damping of the measuring pendulum and is carried out as follows. The dispersion to be tested is applied in a wet film thickness of 150 microns to a 3-nm-thick glass plate. Then the plate is ventilated and stoved for 30 minutes at different temperatures. The pendulum hardness in seconds is determined after cooling for one hour at room temperature. The hardness the film increases with an increase in seconds.

| | Pendulum Hardness in Seconds after after Stoving for 30 Minutes at | | | | |
|---|---|---|---|---|---|
| | 50° C. | 100° C. | 120° C. | 140° C. | 160° C. |
| Dispersion | | | | | |
| Example 1 | 105 | 120 | 137 | 153 | 167 |
| Example 2 | 83 | 93 | 110 | 122 | 130 |
| Example 3 | 74 | 83 | 97 | 115 | 130 |
| Example 4 | 35 | 43 | 57 | 76 | 74 |
| Example 5 (comparison) | 41 | 32 | 43 | 52 | 55 |
| Example 6 (comparison) | 95 | 92 | 95 | 100 | 97 |

The dispersions of the Examples 1 to 4 show an increase in pendulum hardness by 50 to 110 percent after stoving. The dispersion of Example 5 which contains only N-isobutoxymethylacrylamide shows an increase in pendulum hardness by only 35 percent after stoving. The dispersion of Example 6 which does not contain a crosslinking monomer does not show a higher pendulum hardness.

EXAMPLE 7

(application)

Formulation of a white lacquer based on the copolymer dispersion of Example 1. The lacquer was homogenized using a high-speed stirrer. During a period of 25 minutes the materials were placed in the following sequence into a mixing container:

330.00 g of dispersion of Example 1
3.5 g of ammonia (25%)
2.0 g of ammonium polyacrylate (25%)
1.0 g of defoamer
210.0 g of titanium dioxide (Rutile type)

After dispersing for 10 minutes in the high speed stirrer the following components were added:

400.0 g of dispersion of Example 1
4.5 g of ammonia (25%)
1.0 g of defoamer
15.0 g of propanediol-1,2
10.0 g of butylglycol The mixture was dispersed further for 15 minutes.

The batch was then standardized with water to obtain a flow time of 20 seconds. The finished lacquer was applied to different substrates with an 80-micron spiral doctor knife and was stoved at 150° C. for 4 minutes. With a steel sheet the Erichsen impact resistance test showed a result of 9.8 mm. The lacquer had a pendulum hardness of 134 seconds and the gloss was 89 percent.

The solvent resistance test was carried out as follows. A cotton pad soaked with methyl ethyl ketone or 50 percent ethanol was moved to and fro with a slither constant stress over the same area of the coating until the substrate became visible. The solvent resistance of the coating was stated in double strokes.

In Example 7, 230 and more than 300 double strokes were obtained with methyl ethyl ketone and 50 percent ethanol, respectively.

EXAMPLE 8

(application)

Example 8 was carried out similarly to Example 7, the difference being that the dispersion of Example 2 was used instead of the dispersion of Example 1.

The following test results were obtained:

| | |
|---|---|
| Erichsen impact resistance test | 9.9 mm |
| Pendulum hardness | 118 s |
| Gloss | 93 % |
| Solvent resistance | |
| to methyl ethyl ketone | 300 double strokes |
| to 50% ethanol | 300 double strokes |
| Grid cut | |
| on untreated aluminum | 0 |
| on untreated steel sheet | 0 |
| on zinced steel sheet | 0 |
| on specially zinced iron sheet (Sendzimir process) | 0 |

EXAMPLE 9

(application, comparison)

Example 9 was carried out similarly to Example 7, the difference being that the dispersion of Example 5 (comparison) was used instead of the dispersion of Example 1.

The following test results obtained:

| | |
|---|---|
| Erichsen impact resistance test | 9.4 mm |
| Pendulum hardness | 60 s |
| Gloss | 88 % |
| Solvent resistance | |
| to methyl ethyl ketone | 13 double strokes |
| to 50% ethanol | 40 double strokes |
| Grid cut | |
| on untreated aluminum | 1 |
| on untreated steel sheet | 0 |
| on zinced steel sheet | 0 |
| on specially zinced iron sheet (Sendzimir process) | 2 |

EXAMPLE 10

(application, comparison)

Example 10 was carried out similarly to Example 7, the difference being that the dispersion of Example 6 (comparison) was used instead of the dispersion of Example 1.

The following test results were obtained:

| | |
|---|---|
| Erichsen impact resistance test | 8.8 mm |
| Pendulum hardness | 143 s |
| Gloss | 74 % |
| Solvent resistance | |
| to methyl ethyl ketone | 9 double strokes |
| to 50% ethanol | 25 double strokes |
| Grid cut | |
| on untreated aluminum | 1 |
| on untreated steel sheet | 2 |
| on zinced steel sheet | 0 |
| on specially zinced iron sheet (Sendzimir process) | 2 |

The high solvent resistance (expressed in double strokes) to 50 percent alcohol and to methyl ethyl ketone is demonstrated. Furthermore, the advantage of higher mechanical loading capacity, expressed by the Erichsen impact resistance, as a result of crosslinking is evident. Moreover, the dispersions, according to the invention, have a higher gloss than the comparison examples.

We claim:

1. An aqueous dispersion comprising an emulsion of a copolymer composed of:
   (a) 20 to 60 weight percent of a monomer which is a vinyl benzene, a $C_1$ to $C_4$ substituted vinyl benzene, a t-butyl acrylate, an ester of alkylmethacrylic acid and $C_1$–$C_5$ monoalcohol, a vinyl ester of a monocarboxylic acid, or a mixture of said monomers, each of the individual monomers having a homopolymer glass temperature higher than 35° C.;
   (b) 25 to 55 weight percent of a monomer which is an ester of acrylic acid and $C_1$–$C_8$ monoalcohol, an ester of methacrylic acid with a $C_5$–$C_{10}$ monoalcohol, a vinyl ester of a $C_1$–$C_{11}$ monocarboxylic acid, or a mixture of said monomers, each of the individual monomers having a homopolymer glass temperature of less than 35° C.;
   (c) 8 to 15 weight percent of an ester of methacrylic acid and a $C_2$–$C_8$ alkane polyol, or an ester of acrylic acid and a $C_2$–$C_8$ alkane polyol;
   (d) 8 to 15 weight percent of a methacrylamide or acrylamide of the general formula

$CH_2=C(R_1)-CONCH-A-O-R_2$ wherein $R_1$ is hydrogen or methyl, A is $C_1$–$C_4$ n- or isoalkylene and $R_2$ is $C_1$–$C_4$-alkyl; and (e) 0.5 to 5 weight percent of an alpha, beta-unsaturated monocarboxylic acid having 3 to 5 carbon atoms or of an alpha, beta-unsaturated dicarboxylic acid with 3 to 5 carbon atoms.

2. An aqueous dispersion according to claim 1 including 0 to 4 weight percent of an amide selected from the group consisting of an amide of an alpha, beta-unsaturated monocarboxylic acid having 3 to 5 carbon atoms per molecule and an alpha, beat-unsaturated dicarboxylic acid having 4 to 5 carbon atoms per molecule.

3. An aqueous dispersion according to claim 1 wherein the monomers of groups (a) are selected from the group consisting of styrene, alpha-methylstyrene, vinyl toluene, tertbutylacrylate, tert-butylmethacrylate, ethylmethacrylate, methylmethacrylate, isopropylmethacrylate, vinylacetate, vinylpivalate, and a mixture of vinyl esters of alpha-tertiary branched carboxylic acids having an average of about 9 carbon atoms per molecule.

4. An aqueous dispersion according to claim 1 wherein the monomers of group (b) are selected from the group consisting of n-butylacrylate, 2-ethylheptylacrylate, n-decylmethacrylate, vinylpropionate, and a mixture of vinyl esters of alpha-tertiary branched carboxylic acids having an average of about 10 carbon atoms per molecule.

5. An aqueous dispersion according to claim 1 wherein the monomers of group (c) are selected from the group consisting of an acrylate of ethanediol, propanediol, butanediol, hexanediol, trimethylolpropane or pentaerythritol.

6. An aqueous dispersion according to claim 1 wherein the monomers of group (c) are selected from the group of a methacrylate of ethanediol, propanediol, butanediol, hexanediol, trimethylolpropane or pentaerythritol.

7. An aqueous dispersion according to claim 1 wherein the monomers of group (d) are selected from the group consisting of etherified N-alkylolacrylamide with methylene as an alkylene group and methyl or isobutyl as an alkyl group, N-alkylolmethacrylamide with methylene as an alkylene group and methyl or isobutyl as an alkyl group, N-isobutoxymethylacrylamide, N-isobutoxymethylmethacrylamide, N-methoxymethylacrylamide, N-methoxymethylmethacrylamide.

8. An aqueous dispersion according to claim 1 wherein the carboxylic acid of group (e) is selected from the group consisting of acrylic acid, methacrylic acid, crotonic acid, maleic acid, fumaric acid, itaconic acid.

9. An aqueous dispersion according to claim 1 wherein the emulsion contains 0.3 to 1.5 weight percent ammonium salts, sodium salts or potassium salts of peroxodisulfuric acid or of peroxodiphosphoric acid, or a mixture thereof as catalyst and 0.1 to 5 weight percent of sodium salts, potassium salts or ammonium salts or sulfosuccinic acid esters, potassium salts or ammonium salts of sulfosuccinic acid esters and semi-esters, alkanol sulfates, oxethylated alkylphenolsulfates, oxethylated fatty alcohol, fatty alcohol ethanolamide having 3 to 20 moles of ethylene oxide, or a mixture thereof as emulsifier.

* * * * *

UNITED STATES PATENT AND TRADEMARK OFFICE
CERTIFICATE OF CORRECTION

PATENT NO. : 4,929,668

DATED : May 29, 1990

INVENTOR(S) : Winfried Zeibig, et al

It is certified that error appears in the above-identified patent and that said Letters Patent is hereby corrected as shown below:

Column 13, line 12:

Claim 2, line 5, "beat-unsaturated" should be --beta-unsaturated--.

Column 14, lines 23-34:

Claim 9 should read as follows:

9. An aqueous dispersion according to claim 1 wherein the emulsion contains 0.3 to 1.5 weight percent ammonium salts, sodium salts or potassium salts of peroxodisulfuric acid or of peroxodiphosphoric acid, or a mixture thereof as catalyst and 0.1 to 5 weight percent of sodium salts, potassium salts or ammonium salts of sulfosuccinic acid esters and sulfosuccinic acid semi-esters, alkanol sulfates, oxethylated alkylphenolsulfates, oxethylated fatty alcohol, fatty alcohol ethanolamide having 3 to 20 moles of ethylene oxide, or a mixture thereof as emulsifier.

Signed and Sealed this

Sixth Day of August, 1991

*Attest:*

*Attesting Officer*

HARRY F. MANBECK, JR.

*Commissioner of Patents and Trademarks*